US012766646B2

(12) United States Patent
Wen et al.

(10) Patent No.: US 12,766,646 B2
(45) Date of Patent: Oct. 20, 2026

(54) WELDING POSITIONING FIXTURE

(71) Applicant: CONTEMPORARY AMPEREX TECHNOLOGY (HONG KONG) LIMITED, Hong Kong (CN)

(72) Inventors: Changjin Wen, Ningde (CN); Qiming Li, Ningde (CN); Ruilian Nie, Ningde (CN); Bin Zhao, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 261 days.

(21) Appl. No.: 18/754,688

(22) Filed: Jun. 26, 2024

(65) Prior Publication Data

US 2024/0342840 A1 Oct. 17, 2024

Related U.S. Application Data

(63) Continuation of application No. PCT/CN2022/142599, filed on Dec. 28, 2022.

(30) Foreign Application Priority Data

Jan. 4, 2022 (CN) ........................ 202220038446.3

(51) Int. Cl.
*B25B 11/00* (2006.01)
*B23K 37/04* (2006.01)
*B23K 101/36* (2006.01)

(52) U.S. Cl.
CPC ...... *B23K 37/0435* (2013.01); *B23K 2101/36* (2018.08)

(58) Field of Classification Search
CPC ........... B25B 11/00; B25B 11/02; B23Q 3/00; B23Q 3/06; B23K 37/0435
See application file for complete search history.

(56) References Cited

U.S. PATENT DOCUMENTS 2,815,052 A * 12/1957 Krasnow .................. B25B 5/08 269/239
5,931,726 A * 8/1999 Peters .................. B24B 47/203 451/305

(Continued)

FOREIGN PATENT DOCUMENTS

CN 204524655 U 8/2015
CN 107598375 A 1/2018

(Continued)

OTHER PUBLICATIONS

The European Patent Office (EPO) The Extended European Search Report for 22918459.3, Apr. 29, 2025 119 Pages.

(Continued)

*Primary Examiner* — Lee D Wilson
(74) *Attorney, Agent, or Firm* — ANOVA LAW GROUP, PLLC

(57) ABSTRACT

A welding positioning fixture includes a support device, two first lateral-pressing devices and a downward-pressing device. Two battery modules float along a first direction, the two first lateral-pressing devices are pressed on the first sides of the battery modules respectively, and the downward-pressing device is used for positioning the battery modules along the first direction. Each first lateral-pressing device has a first positioning surface. When the first positioning surfaces of the two first lateral-pressing devices are moved to the same preset height, and a second positioning surface is pressed on top sides of the two battery modules, the two battery modules can float in the first direction so that the hanging lug of each battery module abuts against the corresponding first positioning surface.

12 Claims, 5 Drawing Sheets

(56) References Cited

U.S. PATENT DOCUMENTS

| | | | | |
|---|---|---|---|---|
| 9,186,777 | B2 * | 11/2015 | Woods | B25B 5/04 |
| 9,205,523 | B2 * | 12/2015 | Yang | B23Q 3/18 |
| 10,632,592 | B2 * | 4/2020 | Weber | B25B 1/2484 |
| 10,828,737 | B2 * | 11/2020 | Wawro | B25B 5/10 |
| 12,220,739 | B2 * | 2/2025 | Stuart | B21D 5/0281 |
| 2024/0342840 | A1 * | 10/2024 | Wen | B23K 26/21 |

FOREIGN PATENT DOCUMENTS

| | | | |
|---|---|---|---|
| CN | 207459080 | U | 6/2018 |
| CN | 208322464 | U | 1/2019 |
| CN | 208761470 | U | 4/2019 |
| CN | 110315263 | A | 10/2019 |
| CN | 211438660 | U | 9/2020 |
| CN | 212967778 | U | 4/2021 |
| CN | 113547263 | A | 10/2021 |
| CN | 216706381 | U | 6/2022 |

OTHER PUBLICATIONS

The World Intellectual Property Organization (WIPO) International Search Report and Written Opinion for PCT/CN2022/142599 Feb. 27, 2023 14 pages (including English translation).

The China National Intellectual Property Administration (CNIPA) The Notice of Grant of Utility Model Patent Right for Chinese Application 201910088439.7, May 18, 2022 2 Pages (With Translation).

* cited by examiner

WELDING POSITIONING FIXTURE

CROSS-REFERENCE TO RELATED APPLICATIONS

The present application is a continuation of International Application No. PCT/CN2022/142599, filed on Dec. 28, 2022, which claims priority to Chinese patent application No. 202220038446.3 filed on Jan. 4, 2022 and entitled “WELDING POSITIONING FIXTURE”, the entire contents of both of which are incorporated herein by reference.

TECHNICAL FIELD

The present application relates to the technical field of power batteries, and in particular, to a welding positioning fixture.

BACKGROUND

At present, power batteries of new energy vehicles are formed by combining multiple different battery modules together to form a large module structure to meet the power needs of the vehicles. During assembly, two battery modules are first welded into a double-module assembly, and then a plurality of double-module assemblies are connected in series, in parallel or in parallel-series connection to form a whole and accommodated in a box. In the process of forming the double-module assembly, it is needed to assemble the single battery module first, then assemble the two battery modules, and finally weld them. Since the bottom of the battery module is used as the positioning reference during each assembly, there are many dimension rings, and the flatness of the hanging lugs on the sides of the battery module cannot be well guaranteed, resulting in low assembly accuracy.

SUMMARY

In view of this, the present application discloses a welding positioning fixture.

A welding positioning fixture is used for positioning two battery modules, and a hanging lug is arranged on a first side of each battery module in a protruding mode. The welding positioning fixture includes a support device, two first lateral-pressing devices and a downward-pressing device. The two battery modules are placed on the support device and can float along a first direction, the two first lateral-pressing devices are pressed on the first sides of the battery modules respectively and position the battery modules along a second direction perpendicular to the first direction, and the downward-pressing device is used for positioning the battery modules along the first direction. Each first lateral-pressing device has a first positioning surface, and the downward-pressing device has a second positioning surface. When the first positioning surfaces of the two first lateral-pressing devices are moved to the same preset height, and a second positioning surface is pressed on top sides of the two battery modules, the two battery modules can float in the first direction so that the hanging lug of each battery module abuts against the corresponding first positioning surface. In the above-mentioned welding positioning fixture, the support device can bear the battery modules, and the battery modules can float in the first direction to avoid the battery modules being constrained in the first direction and unable to abut against the first positioning surfaces; and the hanging lugs of the two battery modules are positioned in the first direction with the first positioning surfaces as a reference, so as to better ensure the flatness of the hanging lugs of the two battery modules, thereby alleviating the defect that the flatness of hanging lugs cannot meet the assembly requirements due to the traditional positioning reference with the bottoms of the battery modules.

In one embodiment, the support device includes a bearing platform and a floating mechanism, the bearing platform is provided with an accommodating groove, the floating mechanism is arranged on a bottom wall of the accommodating groove and can elastically extend and retract along the first direction, and the battery modules are accommodated in the accommodating groove and abut against the floating mechanism. With this arrangement, when the downward-pressing device is pressed on the top sides of the two battery modules, the battery modules can float up and down in the accommodating groove, thereby abutting against the first positioning surfaces, and achieving effective positioning of the hanging lugs of the battery modules.

In one embodiment, each first lateral-pressing device further has a third positioning surface perpendicular to the first positioning surface, and the third positioning surfaces are used for abutting against the first sides of the battery modules. Through this arrangement, the first positioning surfaces of the first lateral-pressing devices can be used for positioning the hanging lugs of the two battery modules, and the third positioning surfaces of the first lateral-pressing devices can be used for positioning the two battery modules along the second direction, which is beneficial to reducing the number of the lateral-pressing devices, saving space and facilitating operations.

In one embodiment, the first lateral-pressing device includes a first driving mechanism and a lateral-pressing seat, and the first driving mechanism is connected to the lateral-pressing seat and used for driving the lateral-pressing seat to move in translation and/or up and down. By driving the lateral-pressing seats to move in translation and/or up and down, the positions of the first positioning surfaces and the third positioning surfaces can be flexibly adjusted.

In one embodiment, the lateral-pressing seat includes a first support rod and a second support rod connected perpendicularly, the second support rod is connected to the first driving mechanism, and the first positioning surface and the third positioning surface are arranged on different sides of the first support rod. The third positioning surfaces of the first lateral-pressing devices can be used for positioning the two battery modules along the second direction, which is beneficial to reducing the number of the lateral-pressing devices.

In one embodiment, the first support rod is in a shape of a rectangular parallelepiped, and the first positioning surface and the third positioning surface are both planes. Through this arrangement, the positioning flatness of the hanging lugs and the battery modules can be better ensured.

In one embodiment, a plurality of second support rods are provided, and the second support rods are arranged side by side and at intervals on the first support rod. With this arrangement, when the first driving mechanisms drive the lateral-pressing seats to press the battery modules, pressure is evenly distributed on the second support rods.

In one embodiment, the welding positioning fixture further includes two second lateral-pressing devices, the second lateral-pressing devices are used for positioning the battery modules along a third direction, and the third direction is perpendicular to the first direction and the second direction.

Through this arrangement, the two battery modules can be positioned in the third direction to prevent the battery modules from moving.

In one embodiment, the second lateral-pressing device includes a second driving mechanism, a first lateral-pressing block and a second lateral-pressing block, the second driving mechanism is used for driving the first lateral-pressing block and the second lateral-pressing block to move relative to each other in the third direction, and the first lateral-pressing block and the second lateral-pressing block are pressed on end sides of the battery module. Through this arrangement, the two battery modules can be positioned in the third direction through the two lateral-pressing blocks to prevent the battery modules from moving.

In one embodiment, the number of the support devices is two, the two support devices can be close to or far away from each other, each support device is provided with a battery module, and each battery module corresponds to a first lateral-pressing device and a second lateral-pressing device. Through this arrangement, the two battery modules can float in the first direction on the corresponding support devices respectively, the position adjustment of the battery modules is more flexible, and the practicability is higher.

In one embodiment, the downward-pressing device includes a downward-pressing driving mechanism and a downward-pressing seat, the downward-pressing driving mechanism is used for driving the downward-pressing seat to move in translation and/or up and down, and the second positioning surface is arranged at the bottom of the downward-pressing seat. The downward-pressing seat is driven to move by the downward-pressing driving mechanism, thereby adjusting the position of the second positioning surface.

REFERENCE NUMERALS

Figure 1:
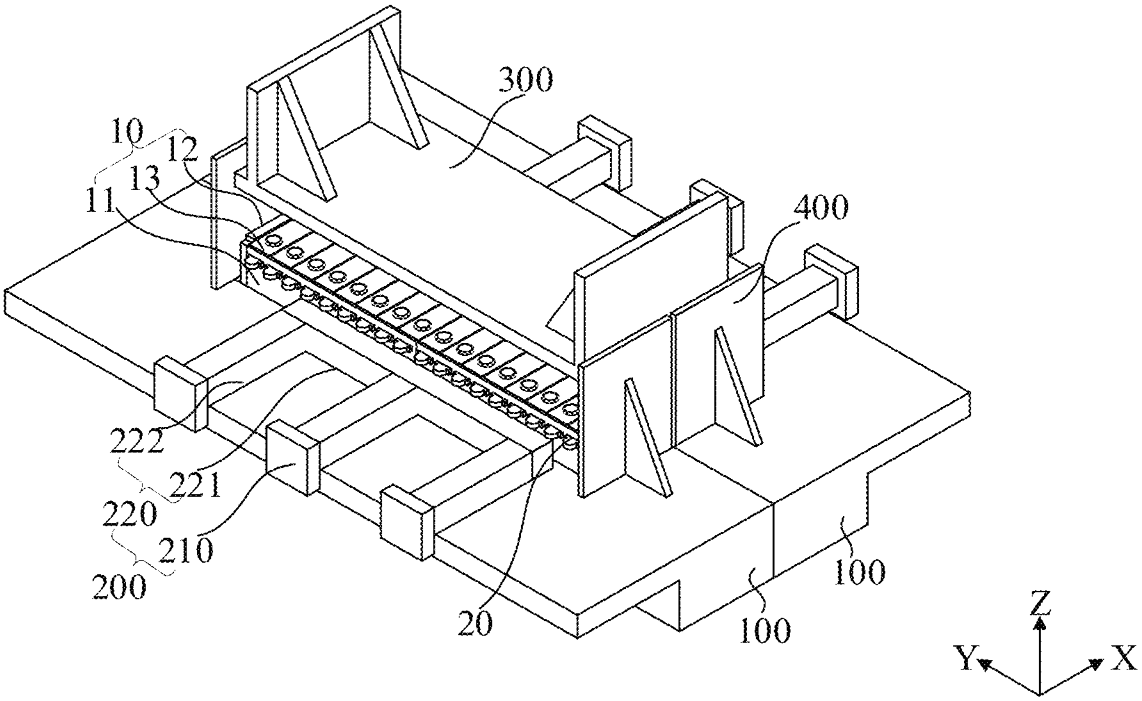
FIG. 1 is a first schematic diagram of a welding positioning fixture in one embodiment.

10. Battery module; 11. First side; 12. End side; 13. Top side; 20. Hanging lug; 100. Support device; 110. Bearing platform; 111. Accommodating groove; 120. Floating mechanism; 200. First lateral-pressing device; 201. First positioning surface; 202. Third positioning surface; 210. First driving mechanism; 220. lateral-pressing seat; 221. First support rod; 222. Second support rod; 300. Downward-pressing device; 301. Second positioning surface; 310. Downward-pressing seat; 400. Second lateral-pressing device; 410. First lateral-pressing block; and 420. Second lateral-pressing block.

DETAILED DESCRIPTION

In order to make the above objects, characteristics and advantages of the present application more obvious and understandable, the detailed description of the present application will be described in detail below in combination with the accompanying drawings. Many specific details are set forth in the following description to facilitate full understanding of the present application. However, the present application can be implemented in many other ways different from those described here, and those skilled in the art can make similar improvements without violating the connotation of the present application. Therefore, the present application is not limited by the specific embodiments disclosed below.

In the description of the present application, it should be understood that the orientation or positional relationships indicated by the terms “central”, “longitudinal”, “transverse”, “length”, “width”, “thickness”, “upper”, “lower”, “front”, “rear”, “left”, “right”, “vertical”, “horizontal”, “top”, “bottom”, “inner”, “outer”, “clockwise”, “anticlockwise”, “axial”, “radial”, “circumferential”, etc. are based on the orientation or positional relationships shown in the drawings and are only for facilitating the description of the present application and simplifying the description, rather than indicating or implying that the apparatus or element referred to must have a particular orientation or be constructed and operated in a particular orientation, and therefore will not be interpreted as limiting the present application.

In addition, the terms “first” and “second” are used for descriptive purposes only, and cannot be construed as indicating or implying relative importance or implicitly indicating the number of technical features indicated. Therefore, a feature defined by “first” or “second” may expressly or implicitly include at least one of the features. In the description of the present application, the meaning of “a plurality of” is at least two, for example two or three, unless otherwise explicitly and specifically defined.

In the present application, unless otherwise expressly specified and limited, the terms “mount,” “link,” “connect” and “fix” should be broadly understood, for example, they may be a fixed connection or a detachable connection or be integrated; or may be a mechanical connection or an electrical connection; or may be a direct connection or an indirect connection through an intermediate medium, or may be a communication between the interior of two elements or the interaction of two elements, unless otherwise specifically defined. For those of ordinary skill in the art, the specific meanings of the above terms in the present application can be understood according to specific situations.

In the present application, unless otherwise explicitly specified and defined, the expression a first feature being “on” or “under” a second feature may be the case that the first feature is in direct contact with the second feature, or the first feature is in indirect contact with the second feature via an intermediate medium. Furthermore, the expression the first feature being “over,” “above” and “on top of” the second feature may be a case that the first feature is directly above or obliquely above the second feature, or only means that the level of the first feature is higher than that of the second feature. The expression the first feature being “below”, “underneath” or “under” the second feature may be a case that the first feature is directly underneath or obliquely underneath the second feature, or only means that the level of the first feature is lower than that of the second feature.

It should be noted that when an element is referred to as “fixed to” or “arranged to” another element, it may be directly on the other element or there may be an intermediate element. When one element is considered to be “connected” to another element, it may be directly connected to another element or there may also be an intermediate element. The terms “vertical”, “horizontal”, “top”, “bottom”, “left”, "right" and similar expressions used herein are for illustrative purposes only, and do not indicate that they are the only means of implementation.

With the popularization and promotion of new energy vehicles, the safety and reliability of new energy vehicles are increasingly attracting people's attention. Power batteries are a type of rechargeable battery that is the power source for new energy vehicles, and are widely used in the field of new energy vehicles.

At present, power batteries of new energy vehicles are formed by combining multiple different battery modules together to form a large module structure to meet the power needs of the vehicles. A battery includes a box body and a battery module. The box body is used for accommodating the battery module. A plurality of battery cells may be connected in series or in parallel or in parallel-series connection first to form a battery module, and then a plurality of battery modules are connected in series or in parallel or in parallel-series connection to form a whole that is accommodated in the box body. Alternatively, all battery cells may be directly connected in series, in parallel, or in parallel-series connection, and then the whole formed by all battery cells is accommodated in the box body.

In the present application, two battery modules are first welded into a double-module assembly, and then a plurality of double-module assemblies are connected in series, in parallel or in parallel-series connection to form a whole and accommodated in a box body. In the process of forming the double-module assembly, it is needed to assemble the single battery module first, then assemble the two battery modules, and finally weld them. Since the bottom of the battery module is used as the positioning reference during each assembly, there are many dimension rings, and the flatness of the hanging lugs on the sides of the battery module cannot be well guaranteed, resulting in low assembly accuracy.

Based on the above considerations, the inventors have conducted in-depth research and designed a welding positioning fixture that can improve the assembly accuracy of the double-module assembly and better ensure the flatness of the hanging lugs of the double-module assembly.

Please refer to FIG. 1, a welding positioning fixture in one embodiment is used for positioning two battery modules 10, and a hanging lug 20 is arranged on a first side 11 of each battery module 10 in a protruding mode.

Figure 2:
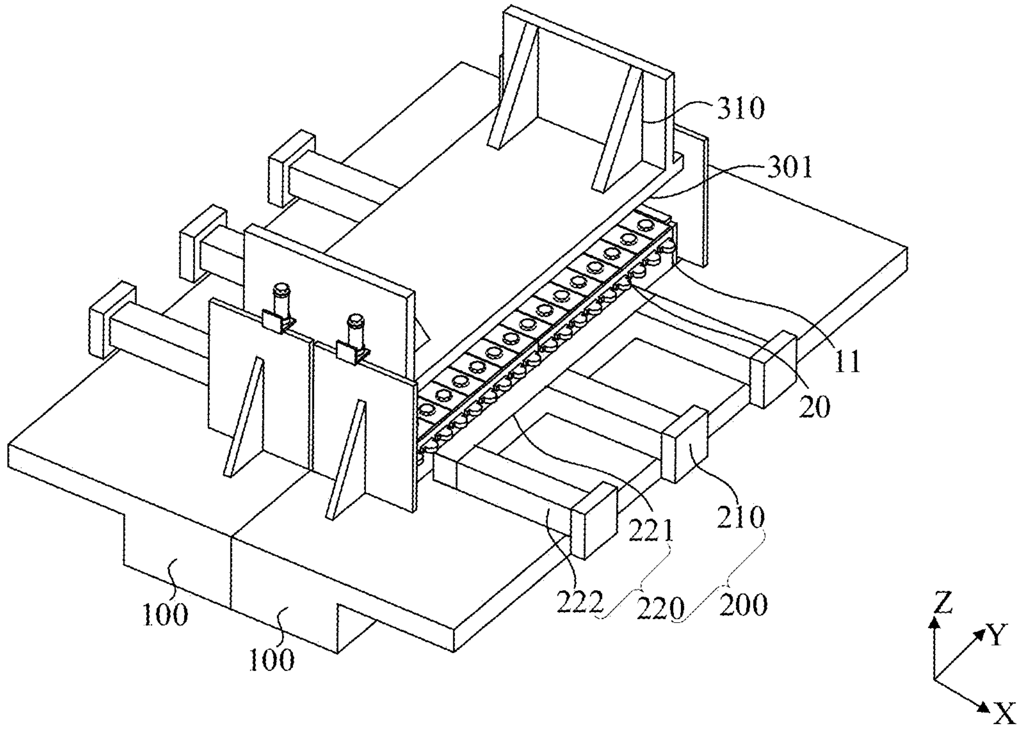
FIG. 2 is a second schematic diagram of a welding positioning fixture in one embodiment.

As shown in FIG. 2, the welding positioning fixture includes support devices 100, two first lateral-pressing devices 200 and a downward-pressing device 300. The two battery modules 10 are placed on the support devices 100 and can float along a first direction. The downward-pressing device 300 is used for positioning the battery modules 10 along the first direction. The two first lateral-pressing devices 200 are pressed on the first sides 11 of the battery modules 10 respectively and position the battery modules 10 along a second direction, and the second direction is perpendicular to the first direction.

Figure 3:
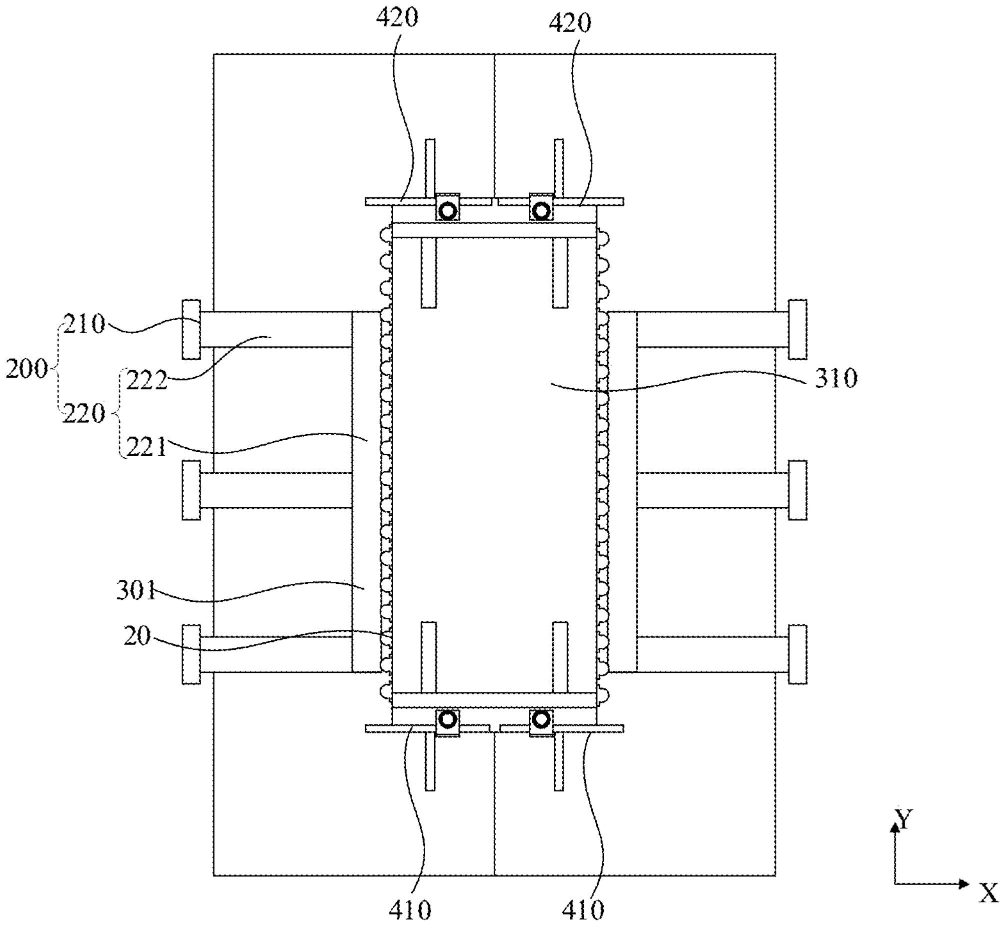
FIG. 3 is a top view of the welding positioning fixture shown in FIG. 2.

Each first lateral-pressing device 200 has a first positioning surface 201, and the downward-pressing device 300 has a second positioning surface 301. As shown in FIG. 3, when the first positioning surfaces 201 of the two first lateral-pressing devices 200 are moved to the same preset height, and the second positioning surface 301 is pressed on top sides 13 of the two battery modules 10, the two battery modules 10 can float in the first direction so that the hanging lug 20 of each battery module 10 abuts against the corresponding first positioning surface 201.

It should be noted that after positioning the two battery modules 10 by the above-mentioned welding positioning fixture, two batteries need to be welded into a double-module assembly, the two opposite sides of the double-module assembly have the hanging lugs 20 respectively, and the double-module assembly is assembled to other components through the hanging lugs 20. Due to assembly requirements, the flatness of the hanging lugs 20 on both sides of the double-module assembly must be ensured, that is, the hanging lugs 20 on both sides of the double-module assembly are located at the same height position to avoid affecting the subsequent assembly process and assembly accuracy.

Through the above arrangement, the support devices 100 can bear the battery modules 10, and the battery modules 10 can float in the first direction to avoid the battery modules 10 being constrained in the first direction and unable to abut against the first positioning surfaces 201; and the hanging lugs 20 of the two battery modules 10 are positioned in the first direction with the first positioning surfaces 201 as a reference, so as to better ensure the flatness of the hanging lugs 20 of the two battery modules 10, thereby alleviating the defect that the flatness of hanging lugs 20 cannot meet the assembly requirements due to the traditional positioning reference with the bottoms of the battery modules 10.

Herein, the first direction is a direction Z shown in FIG. 1, and the second direction is a direction X shown in FIG. 1.

In order to ensure the accuracy of the moving position of the first positioning surfaces 201, in the embodiment as shown in FIG. 1, the welding positioning fixture further includes a sensing module and a controller (not shown) which are electrically connected. The sensing module includes first sensors, which are disposed on the first lateral-pressing devices 200 and used to detect position information of the first lateral-pressing devices 200, and the controller controls the movement of the first lateral-pressing devices 200 according to the position information.

This arrangement effectively ensures that the first positioning surfaces 201 of the two first lateral-pressing devices 200 move to the same preset height, thereby improving positioning accuracy.

In the embodiment shown in FIG. 1, each battery module 10 includes a first side 11, end sides 12, a top side 13, a second side and a bottom side (not shown). The first side 11 and the second side are disposed opposite to each other. The end side 12 is perpendicular to the first side 11 and the second side. There are two end sides 12 and the two end sides 12 are disposed opposite to each other.

In this embodiment, as shown in FIG. 1 and FIG. 2, the support devices 100 support the bottom sides of the battery modules 10, and the first lateral-pressing devices 200 are pressed on the first sides 11 to enable the second sides of the two battery modules 10 to abut against each other, and the end sides 12 of the two battery modules 10 need to be welded.

In a specific implementation, there may be a plurality of hanging lugs 20 disposed on the first sides 11, and the plurality of hanging lugs 20 are arranged side by side and at intervals along a third direction. Herein, the third direction is a direction Y shown in FIG. 1, and the third direction is perpendicular to both the first direction and the second direction.

Figure 4:
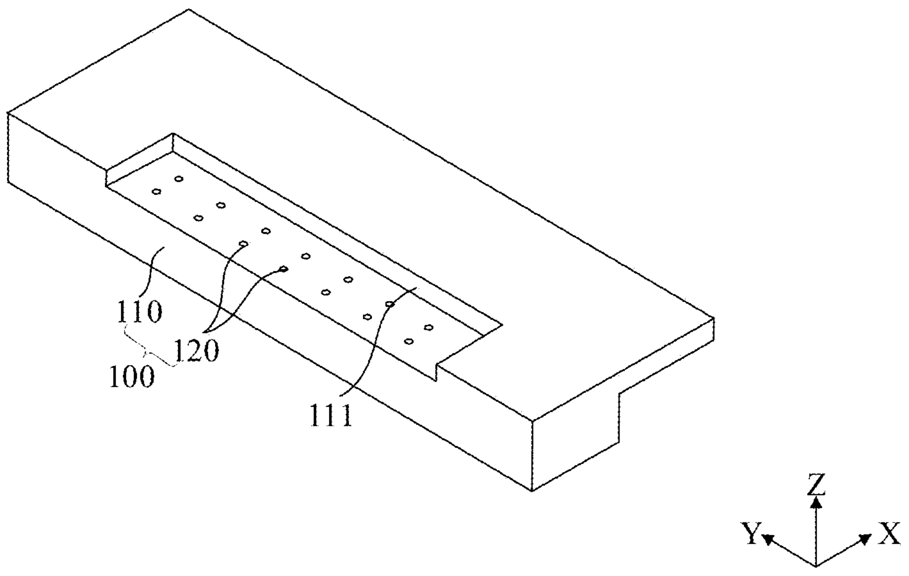
FIG. 4 is a schematic diagram of a support device in the welding positioning fixture shown in FIG. 2.

As shown in FIG. 4, each support device 100 includes a bearing platform 110 and a floating mechanism 120, the bearing platform 110 is provided with an accommodating groove 111, the floating mechanism 120 is arranged on a bottom wall of the accommodating groove 111 and can elastically extend and retract along the first direction, and the battery modules 10 are accommodated in the accommodating groove 111 and abut against the floating mechanism 120.

Through this arrangement, the elastic extension and retraction of the floating mechanisms 120 can enable the battery modules 10 to change positions in the first direction. When the downward-pressing device 300 is pressed on the top sides 13 of the two battery modules 10, the battery modules 10 can float up and down in the accommodating grooves 111, thereby abutting against the first positioning surfaces 201, achieving effective positioning of the hanging lugs 20 of the battery modules 10, and avoiding the situation where the bottom surfaces of the hanging lugs 20 cannot abut against the first positioning surfaces 201 due to the fixed positions of the battery modules 10.

In a specific implementation, the floating mechanisms 120 may be springs, elastic plates or elastic sheets. When the downward-pressing device 300 is pressed on the top sides 13 of the battery modules 10, the floating mechanisms 120 elastically extend and retract to change the positions of the bottom sides of the battery modules 10 in the first direction (the direction Z shown in FIG. 4).

In this implementation, as shown in FIG. 4, the bearing platforms 110 are provided with the floating mechanisms 120, which helps to simplify the assembly steps and the assembly structure. In other implementations, the floating mechanisms 120 may further be detachably assembled on the bearing platforms 110, and the floating mechanisms 120 may be removed when not needed, thereby expanding the application scope of the support devices 100.

The inventors noticed that the two first lateral-pressing devices 200 are not only used to effectively position the hanging lugs 20, but also need to be used to effectively position the two battery modules 10 along the second direction (the direction X shown in FIG. 1). Based on the above considerations, as shown in FIG. 1, each first lateral-pressing device 200 further has a third positioning surface 202 perpendicular to the first positioning surface 201, and the third positioning surfaces 202 are used for abutting against the first sides 11 of the battery modules 10.

Through this arrangement, the first positioning surfaces 201 of the first lateral-pressing devices 200 can be used for positioning the hanging lugs 20 of the two battery modules 10, and the third positioning surfaces 202 of the first lateral-pressing devices 200 can be used for positioning the two battery modules 10 along the second direction, which is beneficial to reducing the number of the lateral-pressing devices, saving space and facilitating operations.

In a specific implementation, as shown in FIG. 1, the third positioning surface 202 in one first lateral-pressing device 200 serves as a positioning reference side, and the third positioning surface 202 in the other first lateral-pressing device 200 serves as a positioning movable side.

It can be understood that, as shown in FIG. 3, before effectively positioning the two battery modules 10 along the second direction (the direction X shown in FIG. 3), the two first lateral-pressing devices 200 can be first moved until their first positioning surfaces 201 are at the same preset height, and then one first lateral-pressing device 200 can be moved along the second direction to a first preset position and remain stationary, and finally the other first lateral-pressing device 200 can be moved along the second direction until the third positioning surface 202 abuts against the first side 11 of the corresponding battery module 10, so that the two first lateral-pressing devices 200 can jointly press the two battery modules 10.

The movement of the first lateral-pressing devices 200 can be controlled by the controller according to the position information fed back by the first sensors.

In the implementation shown in FIG. 1, the first lateral-pressing devices 200 include a first driving mechanism 210 and a lateral-pressing seat 220, and the first driving mechanism 210 is connected to the lateral-pressing seat 220 and used for driving the lateral-pressing seat 220 to move in translation and/or up and down.

Figure 5:
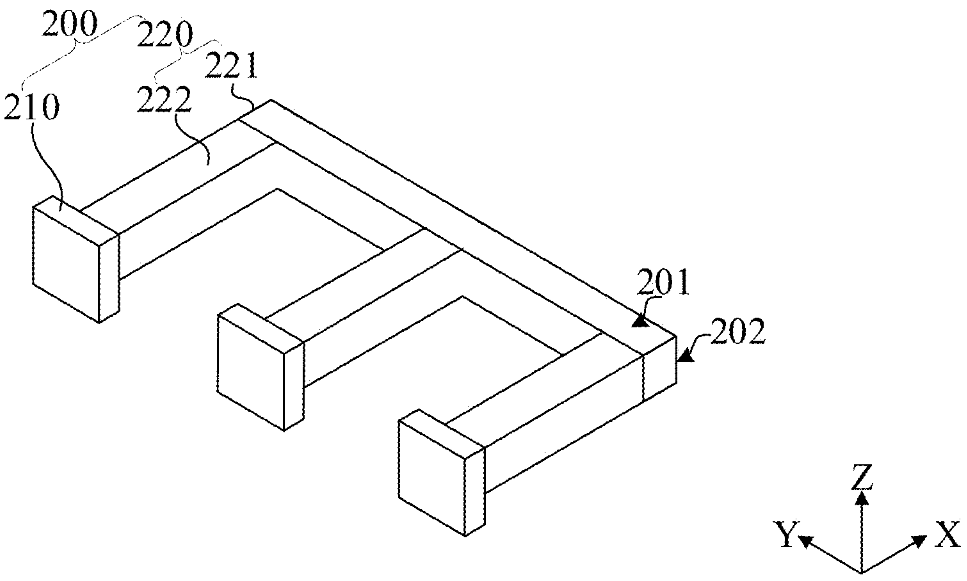
FIG. 5 is a schematic diagram of a first lateral-pressing device in the welding positioning fixture shown in FIG. 2.

In this implementation, as shown in FIG. 5, the first positioning surfaces 201 and the third positioning surfaces 202 are both disposed on the lateral-pressing seats 220. By driving the lateral-pressing seats 220 to move in translation and/or up and down, the positions of the first positioning surfaces 201 and the third positioning surfaces 202 can be flexibly adjusted.

In one implementation, the first driving mechanisms 210 may be motors or cylinders. The first driving mechanisms 210 can drive the lateral-pressing seats 220 to translate, so that the lateral-pressing seats 220 can adjust positions in the second direction (the direction X shown in FIG. 1) and the third direction (the direction Y shown in FIG. 1).

In another implementation, the first driving mechanisms 210 may be motors or cylinders. The first driving mechanisms 210 can drive the lateral-pressing seats 220 to move up and down, so that the lateral-pressing seats 220 can adjust positions in the first direction (the direction Z shown in FIG. 1).

In other implementations, the first driving mechanisms 210 may also be mobile platforms. The first driving mechanisms 210 can drive the lateral-pressing seats 220 to move in translation and/or up and down, so that the lateral-pressing seats 220 can adjust positions in the first direction (the direction Z shown in FIG. 1), the second direction (the direction X shown in FIG. 1) and the third direction (the direction Y shown in FIG. 1).

In the implementations shown in FIG. 1 and FIG. 5, the lateral-pressing seat 220 includes a first support rod 221 and a second support rod 222 connected perpendicularly, the second support rod 222 is connected to the first driving mechanism 210, and the first positioning surface 201 and the third positioning surface 202 are arranged on different sides of the first support rod 221.

In this implementation, as shown in FIG. 5, the first positioning surface 201 is disposed on a top side of the first support rod 221, and the third positioning surface 202 is disposed on a side of the first support rod 221 facing the corresponding battery module 10.

In this implementation, the first support rod 221 is in a shape of a rectangular parallelepiped, and the first positioning surface 201 and the third positioning surface 202 are both planes, so as to better ensure the positioning flatness of the hanging lugs 20 and the battery modules 10.

In this implementation, as shown in FIG. 5, the first support rod 221 and the second support rods 222 are an integrally formed structure, which has good integrity and high mechanical strength. In other implementations, the first support rod 221 and the second support rods 222 may also be a split structure, and the two may be connected by riveting or welding.

In this implementation, as shown in FIG. 5, a plurality of second support rods 222 are provided, and the second support rods 222 are disposed side by side and at intervals on the first support rod 221. With this arrangement, when the first driving mechanisms 210 drive the lateral-pressing seats 220 to press the battery modules 10, pressure is evenly distributed on the second support rods 222, which facilitates positioning.

In this implementation, as shown in FIG. 5, the second support rods 222 are each in a shape of a rectangular parallelepiped. In other implementations, the second support rods 222 may also be in a columnar shape or other irregular shapes.

In this implementation, as shown in FIG. 5, each second support rod 222 is provided with one first driving mechanism 210. In other implementations, only one first driving mechanism 210 may further be provided, and the plurality of second support rods 222 may be driven to move by the same first driving mechanism 210.

The inventors noticed that, as shown in FIG. 3, in addition to positioning the two battery modules 10 in the second direction (the direction X shown in FIG. 3), the two battery modules 10 also need to be positioned in the third direction (the direction Y shown in FIG. 3) to prevent the battery modules 10 from moving.

Based on the above considerations, in the embodiments shown in FIG. 2 and FIG. 3, the welding positioning fixture further includes two second lateral-pressing devices 400, and the second lateral-pressing devices 400 are used for positioning the battery modules 10 along the third direction.

It should be noted here that, as shown in FIG. 1, each second lateral-pressing device 400 positions one battery module 10. Since the end sides 12 of the two batteries need to be welded, the two second lateral-pressing devices 400 are arranged adjacent to each other and an avoidance space should be reserved between adjacent positions of the two. When the two battery modules 10 are positioned by the above-mentioned welding positioning fixture, a laser of a welding device can be irradiated from the avoidance space to the end sides 12 of the two battery modules 10 to achieve welding of the two battery modules 10.

In this embodiment, as shown in FIG. 3, the second lateral-pressing device 400 includes a second driving mechanism, a first lateral-pressing block 410 and a second lateral-pressing block 420, and the second driving mechanism is used for driving the first lateral-pressing block 410 and the second lateral-pressing block 420 to move relative to each other in the third direction.

In a specific implementation, as shown in FIG. 3, the first lateral-pressing blocks 410 serve as positioning reference sides, and the second lateral-pressing blocks 420 serve as positioning movable sides. The first lateral-pressing blocks 410 are moved to preset positions and then kept stationary, and then the second lateral-pressing blocks 420 are moved until the second lateral-pressing blocks 420 abut against and position the battery modules 10. Correspondingly, the second lateral-pressing blocks 420 may be used as the positioning reference sides, and the first lateral-pressing blocks 410 may be used as the positioning movable sides.

In a specific implementation, the second driving mechanisms are motors or cylinders.

It is understandable that the sensing module also includes second sensors (not shown), which are arranged on the second lateral-pressing devices 400 and used to detect position information of the first lateral-pressing blocks 410 and the second lateral-pressing blocks 420. The controller controls the movement of the first lateral-pressing blocks 410 and the second lateral-pressing blocks 420 according to the position information.

In this implementation, as shown in FIG. 2, since the end sides 12 of the battery modules 10 are planes, and the first lateral-pressing blocks 410 and the second lateral-pressing blocks 420 are also flat, so as to better position the battery modules 10.

In the embodiment shown in FIG. 2, the downward-pressing device 300 includes a downward-pressing driving mechanism (not shown) and a downward-pressing seat 310. The downward-pressing driving mechanism is used to drive the downward-pressing seat 310 to move in translation and/or up and down.

In this embodiment, as shown in FIG. 2, the second positioning surface 301 is disposed at the bottom of the downward-pressing seat 310. The downward-pressing seat 310 is driven to move by the downward-pressing driving mechanism, thereby changing the position of the second positioning surface 301.

In this implementation, as shown in FIG. 2, since the top sides 13 of the battery modules 10 are planes, the second positioning surface 301 is also a plane.

In one implementation, the downward-pressing driving mechanism may be a motor or a cylinder. The downward-pressing driving mechanism can drive the downward-pressing seat 310 to translate, so that the downward-pressing seat 310 can adjust the position in the second direction (the direction X shown in FIG. 2) and the third direction (the direction Y shown in FIG. 2).

In another implementation, the downward-pressing driving mechanism may be a motor or a cylinder. The downward-pressing driving mechanism can drive the downward-pressing seat 310 to move up and down, so that the downward-pressing seat 310 can adjust the position in the first direction (the direction Z shown in FIG. 2).

In other implementations, the downward-pressing driving mechanism may also be a mobile platform. The downward-pressing driving mechanism can drive the downward-pressing seat 310 to move in translation and/or up and down, so that the downward-pressing seat 310 can adjust the position in the first direction (the direction Z shown in FIG. 2), the second direction (the direction X shown in FIG. 2) and the third direction (the direction Y shown in FIG. 2).

In the embodiment shown in FIG. 1, the number of the support devices 100 is two, the two support devices 100 can be close to or far away from each other, and each support device 100 is provided with a battery module 10.

Through this arrangement, the two battery modules 10 can float in the first direction on the corresponding support devices 100 respectively, the position adjustment of the battery modules 10 is more flexible, and the practicability is higher.

In this embodiment, each battery module 10 corresponds to a first lateral-pressing device 200 and a second lateral-pressing device 400. The two battery modules 10 share a downward-pressing device 300.

According to some embodiments of the present application, referring to FIG. 1, the present application provides a welding positioning fixture, which includes two support devices 100, two first lateral-pressing devices 200, one downward-pressing device 300 and two second lateral-pressing devices 400. A battery module 10 is placed on each support device 100, and the battery modules 10 are positioned in a third direction (the direction Y shown in FIG. 1) by the second lateral-pressing devices 400, so that the two support devices 100 move and approach each other; after moving the two first lateral-pressing devices 200 until their first positioning surfaces 201 are at the same preset height, the two first lateral-pressing devices 200 are moved and press the two battery modules 10 in a second direction (the direction X shown in FIG. 1); and a pressing mechanism is moved until a second positioning surface 301 is pressed on top sides 13 of the two battery modules 10, and the two battery modules 10 float in a first direction (the direction Z shown in FIG. 1) so that a hanging lug 20 of each battery module 10 abuts against the first positioning surfaces 201.

Technical features of the foregoing embodiments may be randomly combined. To make description concise, not all possible combinations of the technical features in the foregoing embodiments are described. However, the combinations of these technical features shall be considered as falling within the scope recorded by this specification provided that no conflict exists.

The above-mentioned embodiments only describe several embodiments of the present application, and the description thereof is specific and detailed, but cannot therefore be understood as a limitation on the patent scope of the present application. It should be noted that those of ordinary skill in the art may further make variations and improvements without departing from the concept of the present application, all of which fall within the scope of protection of the present application. Therefore, the scope of protection of the present patent application shall be subject to the appended claims.

What is claimed is:

1. A welding positioning fixture, comprising:

a support device, configured to allow two battery modules to be placed on the support device and to be capable of floating along a first direction, each of the two battery modules comprising a hanging lug on a first side of the battery module in a protruding mode;

two first lateral-pressing devices, configured to be pressed on the first sides of the battery modules respectively, and to position the battery modules along a second direction perpendicular to the first direction; and a downward-pressing device, used for positioning the battery modules along the first direction;

wherein:

each first lateral-pressing device has a first positioning surface and a third positioning surface perpendicular to the first positioning surface, and the downward-pressing device has a second positioning surface;

the first lateral-pressing device comprises a lateral-pressing seat, the lateral-pressing seat comprising a first support rod and a second support rod connected perpendicularly, the first support rod being in a shape of a rectangular parallelepiped, and the first positioning surface and the third positioning surface being both planes; and when the first positioning surfaces of the two first lateral-pressing devices are moved to the same preset height, and the second positioning surface is pressed on top sides of the two battery modules, the two battery modules are capable of floating in the first direction so that the hanging lug of each battery module abuts against the corresponding first positioning surface.

2. The welding positioning fixture according to claim 1, wherein the support device comprises a bearing platform and a floating mechanism, the bearing platform is provided with an accommodating groove, the floating mechanism is arranged on a bottom wall of the accommodating groove and are capable of elastically extending and retracting along the first direction, and the battery modules are accommodated in the accommodating groove and abut against the floating mechanism.

3. The welding positioning fixture according to claim 1, wherein the third positioning surfaces are used for abutting against the first sides of the battery modules.

4. The welding positioning fixture according to claim 3, wherein the first lateral-pressing device further comprises a first driving mechanism, and the first driving mechanism is connected to the lateral-pressing seat and used for driving the lateral-pressing seat to move in translation and/or up and down.

5. The welding positioning fixture according to claim 4, wherein the second support rod is connected to the first driving mechanism, and the first positioning surface and the third positioning surface are arranged on different sides of the first support rod.

6. The welding positioning fixture according to claim 5, wherein a plurality of second support rods are provided, and the second support rods are arranged side by side and at intervals on the first support rod.

7. The welding positioning fixture according to claim 1, further comprising:

two second lateral-pressing devices, wherein the second lateral-pressing devices are used for positioning the battery modules along a third direction, and the third direction is perpendicular to the first direction and the second direction.

8. The welding positioning fixture according to claim 7, wherein the second lateral-pressing device comprises a second driving mechanism, a first lateral-pressing block and a second lateral-pressing block, the second driving mechanism is used for driving the first lateral-pressing block and the second lateral-pressing block to move relative to each other in the third direction, and the first lateral-pressing block and the second lateral-pressing block are pressed on end sides of the battery module.

9. The welding positioning fixture according to claim 7, wherein the number of the support devices is two, the two support devices are capable of being close to or far away from each other, each support device is provided with a battery module, and each battery module corresponds to a first lateral-pressing device and a second lateral-pressing device.

10. The welding positioning fixture according to claim 1, wherein the downward-pressing device comprises a downward-pressing driving mechanism and a downward-pressing seat, the downward-pressing driving mechanism is used for driving the downward-pressing seat to move in translation and/or up and down, and the second positioning surface is arranged at the bottom of the downward-pressing seat.

11. A welding positioning fixture, comprising:

a support device, configured to allow two battery modules to be placed on the support device and to be capable of floating along a first direction, each of the two battery modules comprising a hanging lug on a first side of the battery module in a protruding mode;

two first lateral-pressing devices, configured to be pressed on the first sides of the battery modules, and to position the battery modules along a second direction perpendicular to the first direction; and a downward-pressing device, used for positioning the battery modules along the first direction;

wherein:

each first lateral-pressing device has a first positioning surface, and the downward-pressing device has a second positioning surface;

the first lateral-pressing device comprises a lateral-pressing seat, the lateral-pressing seat comprising a first support rod and a plurality of second support rods connected to the first support rod perpendicularly, the second support rods being arranged side by side and at intervals on the first support rod; and when the first positioning surfaces of the two first lateral-pressing devices are moved to the same preset height, and the second positioning surface is pressed on top sides of the two battery modules, the two battery modules are capable of floating in the first direction so that the hanging lug of each battery module abuts against the corresponding first positioning surface.

12. A welding positioning fixture, comprising:

a support device, configured to allow two battery modules to be placed on the support device and to be capable of floating along a first direction, each of the two battery modules comprising a hanging lug on a first side of the battery module in a protruding mode;

two first lateral-pressing devices, configured to be pressed on the first sides of the battery modules, and to position the battery modules along a second direction perpendicular to the first direction; and a downward-pressing device, used for positioning the battery modules along the first direction;

wherein:

each first lateral-pressing device has a first positioning surface, and the downward-pressing device has a second positioning surface;

when the first positioning surfaces of the two first lateral-pressing devices are moved to the same preset height, and the second positioning surface is pressed on top sides of the two battery modules, the two battery modules are capable of floating in the first direction so that the hanging lug of each battery module abuts against the corresponding first positioning surface; and each first lateral-pressing device comprises a lateral-pressing seat, the lateral-pressing seat comprises a first support rod and a second support rod connected perpendicularly.

* * * * *